US008605586B2

(12) United States Patent
Park et al.

(10) Patent No.: US 8,605,586 B2
(45) Date of Patent: *Dec. 10, 2013

(54) APPARATUS AND METHOD FOR LOAD BALANCING (75) Inventors: Sungki Park, Ashburn, VA (US); Durga Prasad Satapathy, Ashburn, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 320 days.

This patent is subject to a terminal disclaimer.

(21) Appl. No.: 13/046,832

(22) Filed: Mar. 14, 2011

(65) Prior Publication Data

US 2012/0236712 A1  Sep. 20, 2012

(51) Int. Cl.
*H04L 1/00* (2006.01)
*H04L 12/26* (2006.01)
*H04L 12/28* (2006.01)
*H04L 12/16* (2006.01)
*H04W 4/00* (2009.01)
*H04W 36/00* (2009.01)
*G06F 15/173* (2006.01)

(52) U.S. Cl.
USPC ........... 370/230; 370/331; 455/443; 455/436; 709/238

(58) Field of Classification Search
USPC ........... 370/329, 230, 331; 709/238; 455/443, 455/436
See application file for complete search history.

(56) References Cited

U.S. PATENT DOCUMENTS

| 7,388,838 | B2 | 6/2008 | Abraham et al. | 370/235 |
| 8,149,771 | B2 | 4/2012 | Khivesara et al. | 370/329 |
| 8,233,448 | B2 | 7/2012 | Satapathy et al. | 370/329 |
| 8,285,291 | B2* | 10/2012 | Dinan et al. | 455/443 |
| 8,291,108 | B2* | 10/2012 | Raja et al. | 709/238 |
| 2004/0033806 | A1 | 2/2004 | Daniel et al. | 455/450 |
| 2009/0207731 | A1 | 8/2009 | Carlson et al. | 370/232 |
| 2011/0044262 | A1 | 2/2011 | Satapathy et al. | |
| 2011/0116370 | A1 | 5/2011 | Trac et al. | 370/230.1 |
| 2011/0189997 | A1* | 8/2011 | Tiwari et al. | 455/443 |
| 2011/0249554 | A1 | 10/2011 | Chamas et al. | 370/230 |
| 2011/0256870 | A1* | 10/2011 | Park et al. | 455/436 |
| 2012/0057567 | A1* | 3/2012 | Kruglick | 370/331 |
| 2012/0163173 | A1 | 6/2012 | Satapathy et al. | 370/232 |

* cited by examiner

*Primary Examiner* — Andrew Lai
*Assistant Examiner* — Albert Shih (57) ABSTRACT Systems and methods of balancing traffic load in a wireless communication network include calculating a load metric for each of a plurality of users, wherein each of the plurality of users, in operation, are in communication with a first base station using an overloaded carrier associated with the first base station. Such load metric for each user may include a plurality of metric factors related at least to an associated communication link. Based on the calculated load metric, a transfer-deserving user from the plurality of users may be determined. The transfer-deserving user may be associated with a highest value of an associated calculated load metric. For load balancing at the first base station, the associated communication link of the transfer-deserving user may be transferred from the overloaded carrier to a target carrier, wherein the target carrier may be associated with either the first base station or a second base station.

39 Claims, 8 Drawing Sheets

EQUALIZATION PROBLEM SETUP

MIN MAX($\ell - A_j$)

s.t.

$A_j \leq \ell \; \forall j$ (1)

$A_j = \sum_{i=1}^{N(j)} a_{ij} x_{ij} \; \forall j$ (2)

$\sum_{j=1}^{M} x_{ij} = 1 \; \forall i$ (3)

DECISION VARIABLE: $x_{ij} = \begin{cases} 1 & \text{IF USER (SF) } i \text{ IS ALLOCATED ON CARRIER } j \\ 0 & \text{OTHERWISE} \end{cases}$

WHERE $i, j$ : INDEX OF USER (SF) AND CARRIER, RESPECTIVELY $\ell$ : SOFT LB THRESHOLD ON CARRIER $N(j)$: NUMBER OF ACTIVE USER (SF) ALLOCATED ON CARRIER $j$ $M$ : NUMBER OF CARRIER $a_{ij}$ : WF($u_i$) OF USER $i$ ON CARRIER $j$ WHERE QoS AND MCS ARE REFLECTED $A_j$ : AGREGATED LOAD AT CARRIER $j$

SUB-GRADIENT OPTIMIZATION TECHNIQUE FOR SOLVING THE EQUALIZATION PROBLEM

STEP 1) SET $y_j$ BE AN INITIAL VALUES FOR ALL $j$, $y_j^o$

STEP 2) SOLVE SUBPROBLEM-1, AND OBTAIN $R^*$ $$R^* = \begin{cases} 0 & \text{IF } 1 > \sum_{j}^{M} y_j^o \\ \ell & \text{OTHERWISE} \end{cases}$$

STEP 3) SOLVE SUBPROBLEM-2, AND OBTAIN $x^*_{ij}$ FOR ALL $i$ $$x^*_{ij''} = \begin{cases} 1 & \text{FOR } (i,j'') = \text{ARGMAX}\{(i,j) \mid \max(a_j y_j^o)\} \\ 0 & \text{FOR THE REST } (i,j) \end{cases}$$

STEP 4) SET THE LOWER BOUND BE $LB(y) = R^* + \sum_{j}^{M} y_j^o (\ell - \sum_{i=1}^{N(j)} a_j x^*_{ij} - R^*)$ STEP 5) CALCULATE $UB = R^* = \text{MAX}(\ell - \sum_{i=1}^{N(j)} a_j x^*_{ij})$ STEP 6) OBTAIN $y^*_j$ FOR ALL $j$ BY THE SUBGRADIENT OPTIMIZATION TECHNIQUE, AND SET $y^o_j = y^*_j$ $$\gamma_j(y) = R(y) - \ell + \sum_{i=1}^{N(j)} a_j x^*_{ij}(y), \quad y_j^{s+1} = \text{MAX}(0, y_j^s + t_k \gamma_j^s), \quad t_k = \delta \frac{UB - LB(y^s)}{\|\gamma^s\|^2}$$

STEP 7) CALCULATE GAP(%) = (UB - LB(y))/UB×100. IF GAP ≤ ε THEN STOP.

OTHERWISE, GO TO STEP2)

FIG. 6C

APPARATUS AND METHOD FOR LOAD BALANCING

BACKGROUND

This disclosure is generally related to high speed wireless packet-based data networks and devices. In particular, this disclosure is related to load balancing in wireless networks, e.g., third generation ("3G") or fourth generation ("4G") networks. Examples of 3G networks include networks operating on wireless technologies such as Code Division Multiple Access (CDMA) and Evolution-Data Optimized or Evolution-Data only ("EvDO")/CDMA. Examples of 4G networks include networks operating on wireless technologies include Worldwide Interoperability for Microwave Access ("WiMAX") technologies and Long Term Evolution (LTE) technologies.

In multi-carrier radio access network (RAN) systems, each base station (BS), or base band unit (BBU) and remote radio head (RRH) support multi-carrier frequencies to communicate with a plurality of users geographically covered by that base station. One BS may be deployed per sector or across multiple sectors. In a typical multi-carrier network, due to a constant addition and removal of users or user service flows (SF) served or otherwise associated with a BS, the traffic load handled by a particular carrier (or frequency) of the BS may be much more than one or more other carriers associated with that BS. Accordingly, it is important to balance the collective traffic load served by all the carriers of a BS to maximize capacity and performance of the network, and at the same time, improve the user experience in accessing the network services.

Existing load balancing solutions are restricted to considering only one factor, e.g., number of users served by the overloaded carrier, buffer size, service flow class, etc., for load balancing and/or to only one type of scenario based on which the load balancing process is triggered at the BS. However, taking into account only one criterion or factor to decide which user or service flow should be moved from its existing carrier to another for load balancing purposes may not be a comprehensive, flexible solution. The need for having a comprehensive load balancing solution increases as the number of users increases and the traffic generated by these subscribers also increases.

What is therefore needed is a system and method for a load balancing solution that considers a plurality of factors and provides flexibility, e.g., in terms of using quality of service (QoS) level, particular reasons and/or thresholds for a load balancing trigger, and other parameters, in selecting the plurality of factors.

SUMMARY

The apparatus and method of this disclosure provide various features, functions, and capabilities as discussed more fully in the detailed description. For example, this disclosure provides a novel and useful system and method for use in a communications system, with particular application in wireless telecommunication systems such as those adhering to IEEE 802.16 (Wireless Metropolitan Area Networks—WMAN), IEEE 802.16-2009 (fixed and mobile WiMAX), 3rd Generation Partnership Project (3GPP) Releases 8 and 9, and LTE-Advanced communication standard specifications and/or communication standards for CDMA, EvDO, WiMAX, and LTE. However, this disclosure is not necessarily limited to use with such systems and methods. Also, the various embodiments disclosed herein generally may be realized by software enhancements to already existing base stations without requiring hardware modifications.

In one or more embodiments, this disclosure is directed to an apparatus and method useful for load balancing in wireless networks, for example, 3G and 4G wireless networks, or other networks supporting multiple access scheme such as Orthogonal Frequency Division Multiple Access (OFDMA). More particularly, this disclosure is directed to an apparatus and methods for load balancing for an overloaded carrier associated with a base station of the wireless network. The load balancing techniques and systems described herein may be activated based on one or more triggering scenarios, e.g., upon initial entry of a user in a sector covered by the base station (BS), upon re-entry of a user in the BS sector, during an active session supported by the BS, and other scenarios that are well known to one of ordinary skill in the art.

In general, the load balancing technique described herein includes identifying and selecting a specific user (among a plurality of users in communication with the base station) that is to be moved or transferred from its existing overloaded carrier to a target/candidate carrier. The transfer of that particular user may be based on a comprehensive load metric calculated for each user communicating on the overloaded carrier. The load metric may be a function of a plurality of parameters associated with the users, service flows or other parameters otherwise associated with the wireless network or base station. The load balancing by user transfer is carried out until a load balancing triggering parameter, e.g., traffic load or consumed bandwidth, is less than a user-defined threshold. In some embodiments, the load balancing techniques described herein may be implemented within or in association with a scheduler of the base station of the wireless network.

In one embodiment, a method of balancing traffic load in a wireless communication network includes calculating, e.g., using a processor operatively associated with a first base station, a load metric for each of a plurality of users, that, in operation, are in communication with the first base station using an overloaded carrier associated with the first base station. In some embodiments, the load metric for each of the plurality of users comprises a plurality of metric factors related at least to an associated communication link of that user. For example, the metric factors may include two or more parameters selected from the group consisting of: a service flow type associated with the user, a number of service flows associated with the user, a number of time slots allocated to the user, a modulation and coding scheme assigned to the user, a number of times a user-associated communication link has already been transferred from one carrier to another carrier, a number of times a user-associated communication link has been exchanged between two specific carriers, a service flow type associated with one or more users of a neighbor carrier associated with the first base station or the second base station, and a number of service flows associated with one or more users of the neighbor carrier, wherein each of the service flows of users associated with the overloaded carrier and the service flows of users associated with the neighbor carrier are represented by one of a plurality of Quality of Service (QoS) values.

Based on the calculated load metric, a transfer-deserving user from the plurality of users may be determined. For example, the user with a highest value of an associated calculated load metric may be selected or determined as the transfer-deserving user. Upon determining the user that is to be transferred, the associated communication link of the transfer-deserving user (e.g., service flows associated and operational with the transfer-deserving user) may be transferred or moved from the overloaded carrier to a target carrier, wherein the target carrier may be associated with either the first base station or a second base station (e.g., covering a neighboring sector). In one or more embodiments, the target carrier may be selected such that a traffic load of the target carrier is less than a target load threshold value, a signal strength (SS) of the target carrier is greater than a target SS threshold value, or both.

In one or more embodiments, the load metric calculation or, in general, the load balancing process is triggered responsive to a determination that a traffic load of the overloaded carrier is greater than a first threshold value. In one or more embodiments, if the traffic load of the overloaded carrier is less than the first threshold value and greater than a second threshold value that is less than the first threshold value, a combined traffic load of a plurality of carriers associated with the first base station may be equalized such that an individual traffic load of each of the plurality of the carriers is essentially equalized, wherein the plurality of carriers includes the overloaded carrier. In one or more embodiments, in addition to, or as an alternative to, the above-discussed equalization criterion, the traffic load equalization may be performed if it is determined that the difference in traffic load values of one or more pairs of carriers of the first base station is greater than a relative threshold value.

In one or more embodiments, at least one of the first threshold value or the second threshold value is a function of at least one of a plurality of threshold factors, the plurality of threshold factors comprising one or more parameters selected from the group consisting of: a total number of users in communication with the first base station using the plurality of carriers associated therewith, a total number of utilized time slots associated with the first base station, a number of time slots allocated to each of the plurality of carriers, a service flow type associated with each of the plurality of carriers, a number of service flows associated with each of the plurality of carriers, and a modulation and coding scheme assigned to one or more users associated with each of the plurality of carriers.

In one or more embodiments, after the communication link of the transfer-deserving user is transferred, the process of load metric calculation, and determination and transfer of a transfer-deserving user may be repeated for any remaining users in the plurality of users in communication with the first base station using the overloaded carrier.

In another embodiment, a method of balancing traffic load in a wireless communication network includes determining, using a processor operatively associated with a first base station, whether a new user has been associated with a plurality of existing users based on at least one of a plurality of triggering event. The triggering events may include an initial network entry event, a re-entry event and a handover event. In one or more embodiments, the new user and each of the plurality of existing users, in operation, are in communication with the first base station using an overloaded carrier associated with the first base station. If it is determined that the new user has been associated with the plurality of existing users, a traffic load of the overloaded carrier may be adjusted based on a load metric for each of the plurality of existing users and the new user, the load metric including a plurality of metric factors related to a respective user. The traffic load adjusting may include transferring a communication link of at least one of the plurality of existing users or the new user from the overloaded carrier to a target carrier, wherein the target carrier is associated with either the first base station or a second base station.

In another embodiment, an apparatus capable of operating and balancing traffic load in a wireless network includes a transceiver configured to exchange data with each of a plurality of users via an associated communication link established using an overloaded carrier, and a processor operatively coupled to the transceiver. In one or more embodiments, the processor is configured to calculate a load metric for each of the plurality of users comprising a plurality of metric factors related at least to the associated communication link, determine a user from the plurality of users that is associated with a highest value of an associated calculated load metric as a transfer-deserving user, and transfer the associated communication link of the transfer-deserving user from the overloaded carrier to a target carrier. The target carrier may be associated with either said apparatus or another wireless apparatus of the wireless network.

In another embodiment, a non-transitory computer-readable medium comprising computer readable code physically embodied thereon which, when executed by a processor arranged in a first base station apparatus capable of operating in a wireless network, causes the processor to carry out the operations of calculating a load metric for each of a plurality of users, wherein each of the plurality of users, in operation, are in communication with the first base station using an overloaded carrier associated with the first base station. The load metric for each of the plurality of users may include a plurality of metric factors related at least to an associated communication link. A transfer-deserving user from the plurality of users may be determined based on the calculated load metric. For example, a user associated with a highest value of an associated calculated load metric may be determined as the transfer-deserving user. Upon determination of the transfer-deserving user, the associated communication link of the transfer-deserving user may be transferred from the overloaded carrier to a target carrier. In one or more embodiments the target carrier may be associated with either the first base station or a second base station.

DETAILED DESCRIPTION

In the discussion of various embodiments and aspects of the apparatus and method of this disclosure, examples of a processor may include any one or more of, for instance, a personal computer, portable computer, personal digital assistant (PDA), workstation, web-enabled mobile phone, WAP device, web-to-voice device, or other device. Further, examples of multimode or dual mode 3G/4G devices, e.g., CDMA EvDO/WiMAX or CDMA EvDO/LTE devices may include wireless phone handsets, smart phones, modems, laptop computers with embedded dual-mode functionality, mobile Internet devices such as used for video streaming, and other User Equipment (UE), for example.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Figure 1:
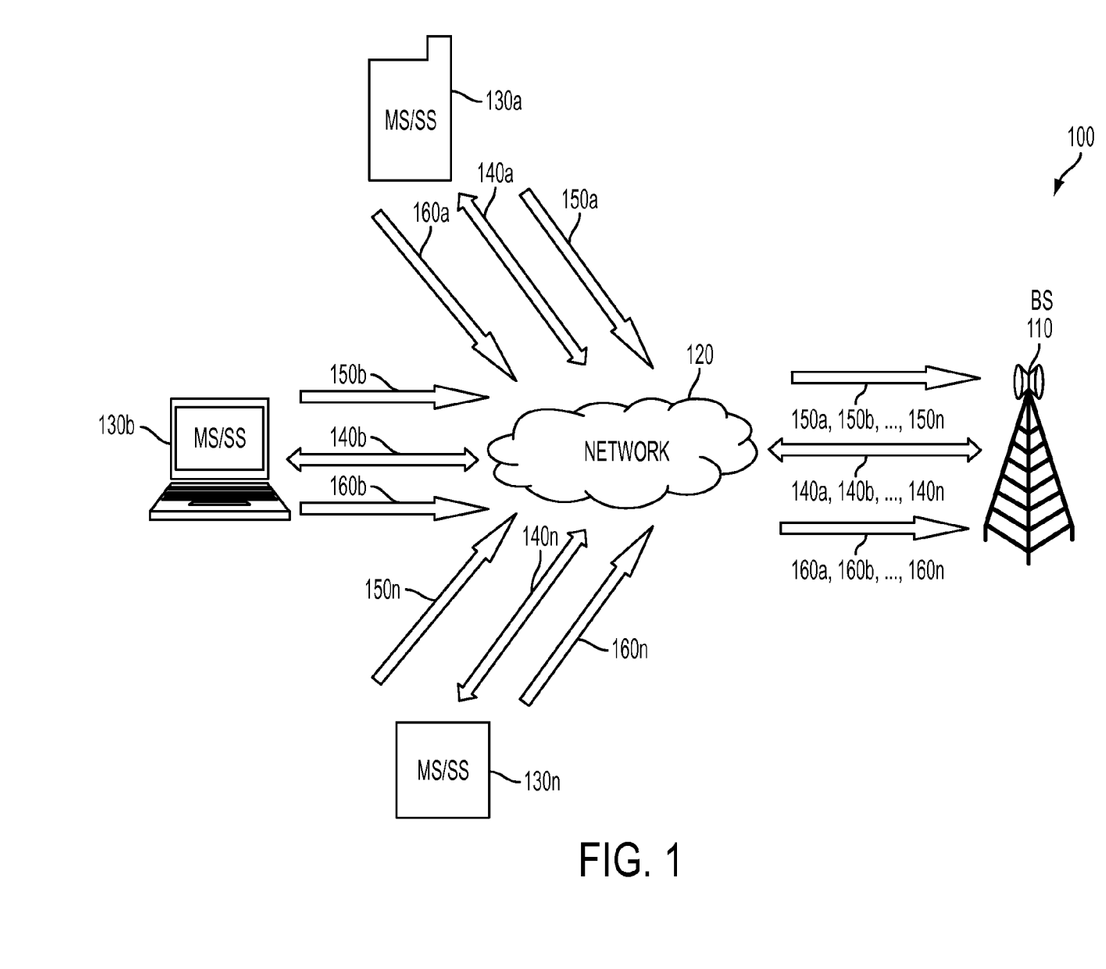
FIG. 1 provides an illustration of a wireless network in which the inventive concept disclosed herein may be employed.

FIG. 1 depicts the architecture of an exemplary wireless network, e.g., a WiMAX network implemented in accordance with various aspects of IEEE Standard 802.16e, or any other 3G or 4G wireless network. In FIG. 1, BS 110 may communicate with one or more Mobile Stations/Subscriber Stations (MS/SS) 130a-130n over network 120 via an associated communication channel or carrier 140a-140n. The terms "SS" and "MS" may be used interchangeably, although it is recognized that MS implies the use of mobility enhancements. In some embodiments, as part of the wireless network shown in FIG. 1, a variety of 4G base stations with associated 4G coverage areas, e.g., WiMAX or LTE coverage areas, and 3G base stations with associated 3G coverage areas (not shown) may be (geographically) neighboring BS 110 and communicating with a plurality of users on same or different frequencies as carriers 140a-140n. Various factors such as the existence of ambient interference around the SS or BS, movement of the SS, and other factors may degrade or otherwise alter the channel condition of the communication channel, making the use of error detection and correction using, e.g., hybrid automatic repeat request (HARQ) desirable to ensure reliable communications over channels 140a-140n. HARQ uplink Acknowledgement Channels (ACKCH) 150a-150n allow each MS/SS 130a-130n to acknowledge packet receipt to BS 110 by use of a HARQ signal transmission over a dedicated HARQ ACK channel. Channel Quality Indicator (CQI) channels 160a-160n provide a path for the MS or SS to identify the relative quality of the communication channel to BS 110 using known techniques.

MS/SS 130a-130n may be relatively fixed or immobile terminal equipment, or may be equipment that includes the mobility functions of a MS, e.g., a cell phone or laptop computer traveling in an automobile or airplane. Also, although not specifically illustrated, it should be understood that, in various embodiments, one or more of MS/SS 130a-130n are configured to operate in accordance with WiMAX and LTE standards, i.e., 4G standards, respectively, and may include a 4G transceiver operatively coupled with one or more antennas, one or more processors, a baseband processing module, a parameter-monitoring module, memory, input/output controller, and other peripherals which may be used to carry out some or all of the functionality described herein. The processor(s) may be configured to execute various functionality associated with processing of information received and/or transmitted from the antennas including, but not limited to, processing data packets received from the associated base station and periodic channel quality reports for the base station. The baseband processing module, e.g., operatively connected with the processor(s), may be configured to convert radio frequency (RF) signals from the associated base station to baseband signals. The parameter monitoring module may provide values of one or more operational parameters, e.g. power, of the mobile device. The memory may be configured to store various data and program instructions, e.g., data packets or frames, monitored operational-parameter values, etc. The input/output controller may operate in conjunction with a user interface of the device to allow display of information to a user, for example, as well as to receive input from the user using conventional input/output devices, among other purposes. If one or more MS/SS 130a-130n is a dual-mode/multimode device, e.g. configured to operate in both 3G EvDO/HSPA and 4G WiMAX/LTE modes, the device may include an additional 3G transceiver which, along with the 4G transceiver, supports the communication in both 3G and 4G modes. One or more of these wireless devices may be pre-provisioned with an optional GPS receiver which may be used in various ways well known to a person of ordinary skill in the art.

In some embodiments, MS/SS 130a-130n may communicate with BS 110 over respective carrier channels 140a-140n using a particular modulation coding scheme (MCS) chosen from a plurality MCS options, e.g., by a scheduler associated with BS 110. MS/SS 130a-130n may be in communication with BS 110 for a variety of services, e.g., voice services and data services such as real-time and non-real time multimedia services. Depending on the type of service, BS 110, or a module therein, may allocate a particular amount of bandwidth (e.g., in terms of number of time slots) on the carrier used by MS/SS 130a-130n to support the service at MS/SS 130a-130n. Apart from managing ample bandwidth to support different services, wireless systems, e.g., WiMAX systems, present various traffic scheduling challenges. For example, the quality of the wireless channel is typically different for different users and randomly changes with time (on both slow and fast time scales). In addition, an excessive amount of interference and higher error rates are typically experienced. Scheduling decides the modulation coding scheme (MCS) and affects error rate, and error rate affects the choice of MCS. In general, mobility complicates resource allocation.

Generally, system scheduling considerations include total available bandwidth; service flow specific scheduling policy; service flow QoS parameters; data queue backlog; Request/Grant Mechanisms (e.g., contention, polling, piggyback); connection air link quality; impact of burst allocation on PHY layer (i.e., burst concurrency, interference property, and memory/processing limitations); and the use of Acknowledgement Repeat Request (ARQ) and/or Hybrid ARQ (HARM).

In a variable wireless link, throughput, latency/delay, and transmission errors vary much more widely over a wireless connection because of constantly changing radio signal conditions and extensive digital radio processing. Standard Internet protocols, designed for use over a more stable wire-based connection, are not well-suited to handle these variations. For shared wireless resources, the same wideband radio channel must be shared among many user sessions and each user session may involve many different types of data streams and protocols. Some applications require bursty, time-sensitive, small-packet data transmissions, while other applications require long, error-sensitive large-packet data streams. To provide acceptable QoS, the network must be able to identify and combine many different types of traffic from many different users without compromising the performance of any of the different user applications.

To support multimedia applications, various wireless standards define different types of service flows to categorize user services and accordingly provide resources. For example, the WiMAX IEEE 802.16e standard defines five types of data delivery service flows for downlink (DL) flows and five corresponding scheduling services for uplink (UL) flows: UGS—Unsolicited Grant Service, with constant bit-rate services (CBR); rtPS—Real Time Polling Service, with variable bit-rate, but sensitive to delay; ertPS—Extended Real Time Polling Service, for VoIP with silence suppression, similar to CBR with gaps; nrtPS—Non-real Time Polling Service, time insensitive, but requiring a minimum bandwidth allocation; and BE—Best Effort. Uplink is differentiated from downlink because uplink flows (except UGS) involve some form of request/grant mechanism for resource allocations. Table I summarizes the various WiMAX data service types.

TABLE I

WiMAX Data Delivery Services

| | QoS | Targeted traffic |
|---|---|---|
| Unsolicited grant service (UGS) | Unsolicited grant service (UGS) | Constant bit rate (CBR) services, TDM services |
| Extended real-time Variable Rate (ERT-VR) | Extended real-time polled service (ertPS) | VoIP with silence suppression/activity detection |
| Real-time Variable Rate (RT-VR) | Real-time polled service (rtPS) | Streaming audio & video |
| Non-real-time Variable Rate (NRT-VR) | Non-real-time polled service (nrtPS) | File transfers |
| Best Effort (BE) | Best Effort (BE) | Web browsing, e-mail, etc. |

Each of these service flow types has a different QoS requirements and is designed to support different types of traffic streams. The order of priority given to services while transmitting is generally as follows: UGS>ertPS>rtPS>nrtPS>BE. However, the particular scheduling mechanism is generally left to be defined by proprietary implementations. Other 4G standards, e.g., LTE standard, have analogous user service types (or QoS requirements) and their defined prioritization. For example, for LTE standard, following is a list of various service type with their respective QoS class identifiers (QCI):

| QCI | Service Type |
|---|---|
| 1 | Guaranteed Bit Rate (GBR), Conversational Voice |
| 2 | GBR, Conversational Video (live streaming) |
| 3 | GBR, Non-conversational Video (buffered streaming) |
| 4 | GBR, Real-time Gaming |
| 5 | Non-GBR, IMS Signaling |
| 6 | Non-GBR, Voice, Video (Live Streaming), Interactive Gaming |
| 7 | Non-GBR, Video (buffered streaming) |
| 8 | Non-GBR, TCP-based (e.g., WWW, e-mail) chat, FTP, p2p file sharing |
| 9 | Non-GBR |

Since the BS governs resource scheduling, uplink resources must either be allocated automatically on a periodic basis, or requested individually as needed by the MS. Resources for UGS and ertPS service flows are periodically allocated according to an unsolicited grant interval (UGI) defined for each service flow. The ertPS service flows can also dynamically request additional resources, i.e., more throughput, as described below. Resources for rtPS, nrtPS and BE service flows must be individually requested (usually triggered by data in the MS buffer.) The BS can automatically offer dedicated uplink opportunities for specific ertPS, rtPS and nrtPS service flows to request bandwidth on a periodic basis (unsolicited polling interval). The ertPS, rtPS, nrtPS and BE service flows can also request bandwidth during a shared uplink opportunity, subject to contention. Once UL resources have been granted, requests for additional UL resources can be "piggybacked" on existing allocations.

Referring to FIG. 1, BS 110 may be serving MS/SS 130a-130n each with one or more types of service flows (UGS, ertPS, rtPS, nrtPS, BE) using an associated carrier 140a-140n with a particular MCS and number of slots allocated to the associated carrier. Depending on the types and number of service flows supported on a carrier, the carrier may be overloaded such that its traffic load is greater than a pre-defined threshold. Moreover, with mobile users moving in and out of the BS covered area, BS 110 may have to support a user during initial network entry (INE), during network re-entry ("re-entry"), or during Hand Over (HO) process. Such addition and/or removal of users (and their service flows) may result in an altered traffic load handled by one or more particular carriers and a changed collective load of BS 110, thus resulting in "unbalanced" BS carriers. While a network standard, e.g., WiMAX, defines the QoS parameters for each service flow type, it does not specify how a scheduler (within or otherwise associated with BS 110) may use these parameters to perform load balancing among carriers 140a-140n of BS 110. Radio Access Network (RAN) suppliers may employ different load balancing algorithms. However, typically, the suppliers do not consider all, or even any, QoS parameters to perform load balancing, specifically, to decide which user or service flow associated with the overloaded carrier should be moved from its existing carrier to balance the traffic load allocating air interface resources. For example, suppliers may only consider one parameter, e.g., number of users (or service flows) communicating using the overloaded carrier, service flow class, etc., to determine the user or service flow that is to be moved as part of the load balancing process.

Figure 2:
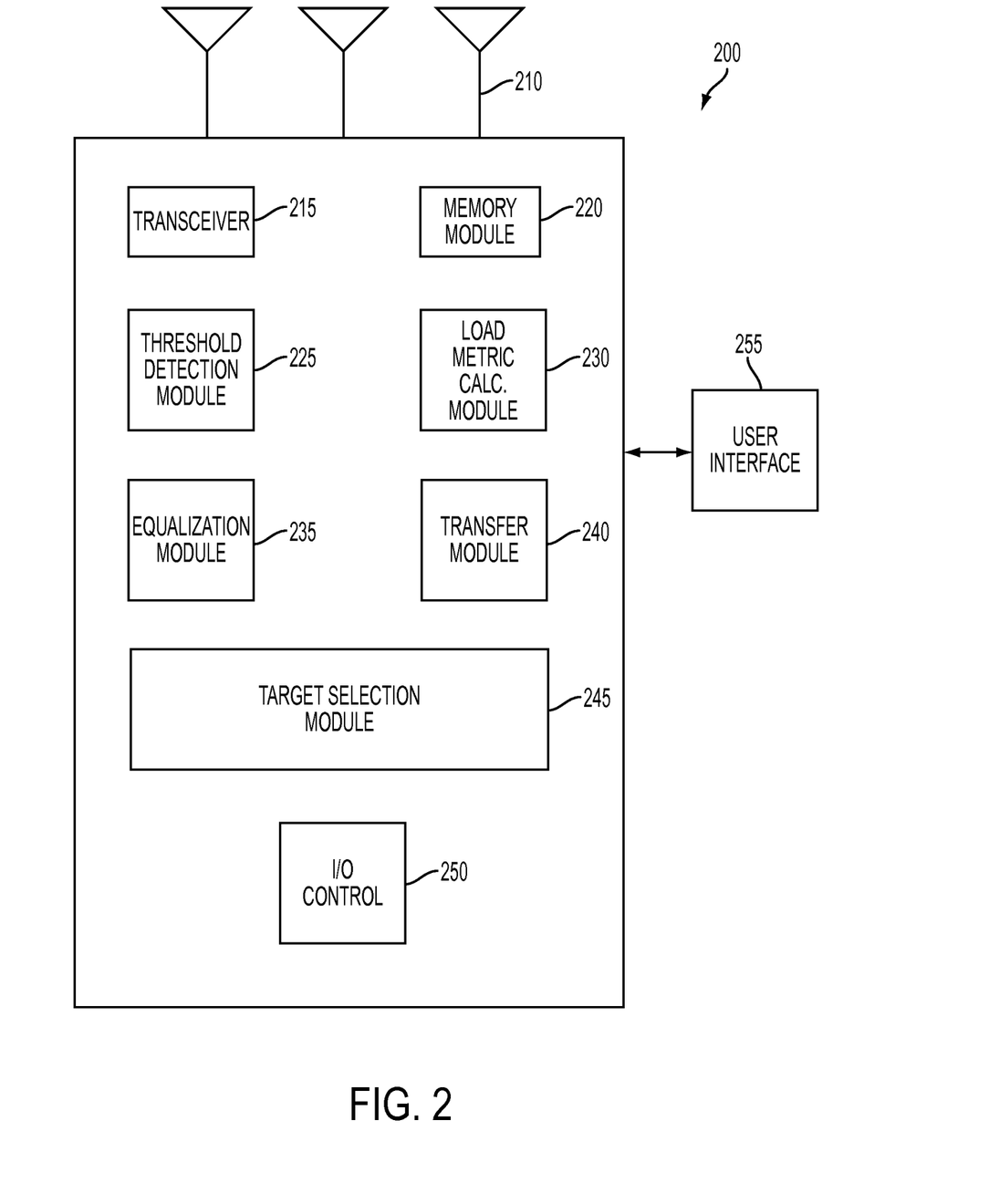
FIG. 2 provides a block diagram of an exemplary embodiment of a base station.

In some embodiments, load balancing techniques described herein are implemented in BS 110 one or more components or modules to carry out some or all of the functions described herein. FIG. 2 shows an exemplary embodiment of apparatus 200, e.g., BS 110 configured, among other functions, for load balancing. Details of structure and functionality of the illustrated base station's modules are discussed as follows.

Refer to FIG. 1, which shows an exemplary apparatus 200 depicting an embodiment of BS 110. Apparatus 200 includes various functional modules and components that may be configured to monitor and detect conditions that relate to triggering of the load balancing process, and perform load balancing among carriers of BS 110, and in some cases, between carriers of BS 110 and one or more neighboring base stations. In some embodiments, apparatus 200 includes antennas 210, transceiver 215, memory module 220, threshold detection module 225, load metric calculation module 230, equalization module 235, transfer module 240, target selection module 245, input/output (I/O) control module 250, and user interface 255. For clarity, resources and/or components of apparatus 200 not required or related to load balancing are not shown in FIG. 2 or subsequent figures of this disclosure, but those resources/components will be appreciated by a person of ordinary skill in the art.

In one or more embodiments, one or more modules of the apparatus 200, or other components that the module may be connected with (not shown in figures) may include one or more processors and/or individual memory modules, to perform the functions and processes described herein. Also, although the modules in FIG. 2 are shown as individual components or elements, in one or more embodiments, those modules may be combined into one or more devices, one or more software programs, or one or more circuits on one or more chips. In some embodiments, some modules or components of apparatus 200 may be part of a system which is located geographically remotely from the rest of the modules or components of apparatus 200. In such a case, the remotely located groups of modules may be operatively connected with each other through a wired or wireless network (not shown) using necessary interfaces and components. Such network may include one or more of a private TCP/IP network, the Internet, or a private or public radio frequency (RF) network.

As would be understood by a person with skill in the art, the functional block diagram of FIG. 2 is presented merely an aid in understanding the various functions of apparatus 200, and actual implementation of the desired functionality may be implemented by fewer or more functional modules, implemented by software code operating on one or more processors.

Transceiver 215 may be operatively connected to antenna 210 to exchange data packets with one or more wireless devices, e.g., MS/SS 130a-130n, based on the wireless technology, e.g., WiMAX, LTE, or in general, any OFDMA-based wireless technology, implemented for network 100. Further, transceiver 215 may be coupled with or may include a baseband processing module (not shown) which may be configured to convert radio frequency (RF) signals received from transceiver 215 to baseband signals.

Figure 3:
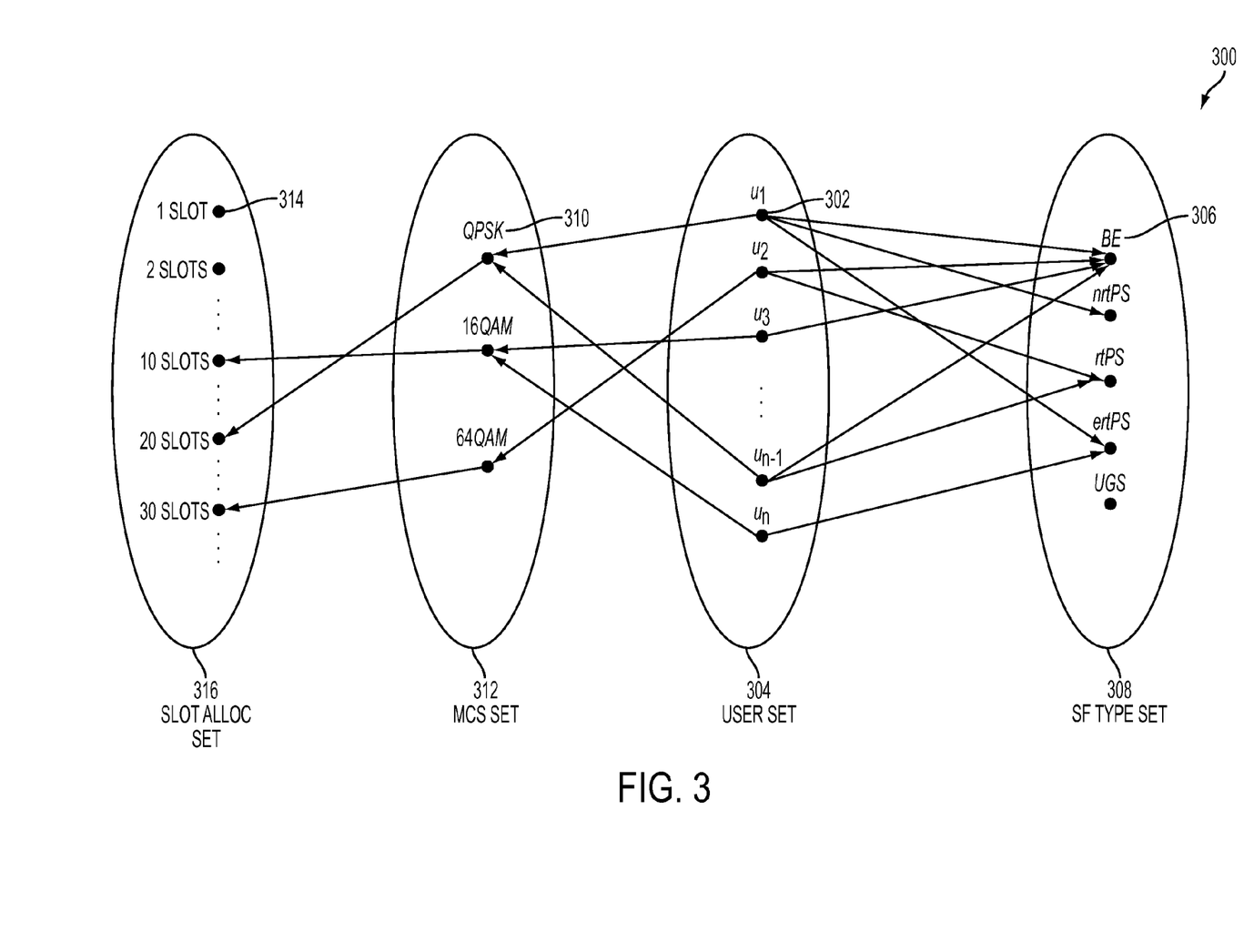
FIG. 3 provides an exemplary graph of relations between a user set and various operational characteristics sets associated with a carrier frequency.

Memory 220 may be configured to store various data and program instructions to facilitate the load balancing operations of one or more modules of (or associated with) apparatus 200. For example, memory 220 may store various data sets including, but not limited to, a user set indicating the number of users associated with BS 110 and information identifying each associated user, a service flow set indicating the number and type of service flows supported by BS 110, an MCS set indicating the number and type of MCS options supported by BS 110, and a slot set indicating the number of slots to be provided to each user in communication with BS 110. Additionally, memory 220 may store a mapping table, e.g., for each carrier of BS 110, that indicates relation between the above-described data sets of BS 110. For example, as shown in FIG. 3, a mapping relation graph for a carrier may indicate users 302 (from user set 304) communicating over that carrier, service flows 306 (from service flow set 308) associated with each user 302, MCS options 310 (from MCS set 312) assigned to each user 302, and number of slots 314 (from slot set 316) allocated to each user 302. In some embodiments, the above-described sets and mapping relation information may be defined and/or computed, and then stored in memory 220, by one or more modules or processors of or otherwise associated with apparatus 200.

Memory 220 may further store reports indicating number of times a particular user communication link or an associated service flow has been transferred from one carrier to another for load balancing, or has been transferred between two specific carriers. Additionally, or alternatively, memory 220 may store threshold values and/or real-time values for various operational parameters (e.g., network load or traffic, total number of users in communication with BS 110, total number of time slots utilized by the associated users, number of time slots allocated to each BS carrier, a service flow type associated with each BS carrier, a number of service flows associated with each BS carrier, and a modulation and coding scheme assigned to one or more users associated with each BS carrier) of wireless network 100 within which apparatus 200 is operating.

Input/output controller 250 may operate in conjunction with user interface 255 to allow display of information to a user, for example, as well as to receive input from the user using conventional input/output devices, among other purposes.

In some embodiments, while in operation, threshold detection module 225 may monitor or receive information from other BS 110 modules regarding one or more operational parameters of each carrier of BS 110, and determine whether the operational parameters are violating, e.g., greater than, one or more threshold values. As discussed above, threshold values may be pre-defined (e.g., by an operator of BS 110) and stored in memory 220. In some embodiments, one or more threshold values utilized by threshold detection module 225 may be computed from or otherwise be function of a plurality of threshold factors including, but not limited to, a total number of users in communication with BS 110 using the plurality of carriers associated therewith, a total number of utilized time slots associated with BS 110, a number of time slots allocated to each of the plurality of carriers of BS 110, a service flow type associated with each of the plurality of carriers of BS 110, a number of service flows associated with each of the plurality of carriers of BS 110, and a modulation and coding scheme assigned to one or more users associated with each of the plurality of carriers of BS 110.

Threshold detection module 225 may be configured to monitor parameters associated with the carriers of BS 110 for one or more scenarios (e.g., INE, re-entry, HO, etc.) that may result in trigger of the load balancing process. Threshold detection module 225 may periodically compare current carrier parameters against various threshold values, e.g., a "hard" threshold value and a "soft" threshold value (e.g., a "absolute" threshold value, a "relative" threshold value, etc.). The periodicity with which threshold detection module 225 monitors the carrier parameters may be configurable. In some embodiments, the soft threshold value is less than the hard threshold value. In some embodiments, threshold detection module 225 may determine that an operational parameter, e.g., traffic load, of a carrier of BS 110 is greater than the hard threshold. In some embodiments, such determination by threshold detection module 225 may be an indicator of the BS carrier being overloaded and thus, a trigger to start the load balancing process.

Accordingly, at the beginning of the load balancing process, load metric calculation module 230 may access the mapping table for the overloaded carrier from memory 220. As discussed above, the mapping table may indicate the users using the overloaded carrier and their associated service flows, assigned MCS and allocated time slots. In some embodiments, each service flow operational on the overloaded carrier (and other carriers of BS 110 or other base stations in network 100) is represented by one of a plurality of Quality of Service (QoS) values. The QoS values may be numerical values pre-defined, e.g., by an operator of BS 110, but each service flow may be assigned a QoS value based on a priority order that is, e.g., pre-defined for load balancing purposes or by a wireless standard (e.g., WiMAX). For example, for load balancing, the various service flows may be prioritized as follows: UGS>ertPS>rtPS>nrtPS>BE, and assigned $W_{QoS}$ values "5," "4," "3," "2," and "1," respectively. QoS values for neighboring carriers of BS 110 or carriers of neighboring base stations may be represented by values, $W_{QoS\_NBR}$, similar or different than the $W_{QoS}$ values. MCS options may be ordered in a specific way for load balancing, e.g., 64 QAM>16 QAM>QPSK, and assigned $W_{MCS}$ values "3," "2," and "1," respectively. Number of time slots used by each user on a carrier may be assigned $W_{slot}$ values "1," "2," "3," "4," . . . and "n," representing the number of time slots allocated to a user. In some embodiments, $W_{QoS}$, $W_{QoS\_NBR}$, $W_{MCS}$, and $W_{slot}$ values, and other values used in load balancing process may be stored in and accessed from memory 220.

In some embodiments, as part of the load balancing technique described herein, load metric calculation module 230 may calculate a comprehensive load metric for the each user in communication with BS 110 using the overloaded carrier. The calculated load metric may be then used to identify or determine one or more particular users or their associated one or more service flows that should be transferred from the overloaded carrier to a target carrier, e.g., using transfer module 240. The target carrier may be associated with BS 110 or may be a carrier associated with a base station neighboring BS 110, and may be selected or identified on by target selection module 245 based on one or more factors related to candidate carriers, e.g., traffic load, signal strength, etc., of the candidate carriers. For example, target selection module 245 may select a candidate carrier as a target carrier if the target carrier's traffic load is less than a target load threshold value, if the target carrier's signal strength is greater than a target signal strength threshold value, or both. In some embodiments, the target load threshold value and the target signal strength threshold value may be stored in and accessed from memory 220.

In some embodiments, load metric calculation module 230 calculates the load metric for each user associated with the overloaded carrier as a function of a plurality (i.e., more than one) of metric factors related at least to a communication link associated with that user. For example, the metric factors may include two or more parameters including, but not limited to, a service flow type and a number of service flows associated with the user (e.g., as represented by a collective $W_{QoS}$ value); a number of time slots allocated to the user (e.g., as represented by a collective $W_{slot}$ value); a modulation and coding scheme assigned to the user (e.g., as represented by a collective $W_{MCS}$ value); a number of times a user-associated communication link has already been transferred from one carrier (e.g., the overloaded carrier) to another carrier and/or a number of times a user-associated communication link has been exchanged between two specific carriers (e.g., as represented by a $W_{CTR}$ value which is initialized as zero); and a service flow type associated with one or more users of a neighbor carrier associated with BS 110 or another base station and a number of service flows associated with one or more users of the neighbor carrier (e.g., as represented by a collective $W_{QoS\_NBR}$ value).

In one or more embodiments, service flow information related to a neighbor carrier (i.e., number, type, etc.) and service flow information related to the user may be exchanged, e.g., using signaling or control messages transmitted to and from BS 110. Based on the exchanged information, available capacity of the neighbor carrier for each service flow type may be estimated. In one or more embodiments, service flow information (e.g., represented by an associated QoS value) regarding a neighbor carrier may be used along with the service flow information (e.g., represented by an associated QoS value) related to the user to calculate the load metric so as to avoid a scenario in which the service flow with, e.g., the lowest QoS value of the user is always chosen to be transferred to a target carrier (e.g., by transfer module 240). For example, based on the exchanged information, if it is determined that a target carrier which can accommodate a user service flow associated with a high QoS value is available, then that user service flow (instead of, e.g., the service flow associated with the lowest QoS value) may be moved from the overloaded carrier of the user to the target carrier, thus providing an overall better user experience. Furthermore, parameters indicating a number of time slots and a modulation and coding scheme assigned to the user may be used in combination with one or more of the above-mentioned parameters, e.g., parameters relating service flow information (or other parameters that will be known to a person of skill in the art) to calculate the load metric for all network users, so that the user assigned with the lowest MCS value or the user assigned with the highest number of slots is not the user whose service flow(s) are always chosen to be transferred to a target carrier. In general, it is a combination of a plurality of factors related, e.g., to a communication link associated with that user based on which the load metric is calculated and thus, a particular user (or its service flow(s)) is selected to be transferred to a target carrier for load balancing purposes.

For example, load metric calculation module 230 may calculate the load metric (LM) for each user using the mathematical operation expressed as follows:

$$LM_{user\_i} = \frac{W_{slot} + W_{MCS} + W_{QoS\_NBR}}{W_{QoS} + W_{CTR}}, \quad \text{Eq. (1)}$$

where $LM_{user\_i}$ is the load metric for user "i" that is using the overloaded carrier. Some of the "W" values used to calculate $LM_{user\_i}$ are determined using the mapping relation graph, e.g., as illustrated in FIG. 3. For example, as shown in mapping graph 300, user u1 is associated with three service flows, BE, nrtPS and ertPS, and therefore using the QoS values assigned to the service flows, the collective $W_{QoS}$ value for user u1 to be used in the above load metric equation is: $W_{QoS}=W_{QoS}(BE)+W_{QoS}(nrtPS)+W_{QoS}(ertPS)=1+2+4=7$. Furthermore, user u1 is assigned QPSK as the MCS option, and therefore, in this example, $W_{MCS}$ value for user u1 is equal to 1. As also shown in mapping graph 300, user u1 is allocated (and is utilizing) 20 time slots of the associated carrier, and therefore, $W_{slot}$ value for user u1, in this example, is equal to 20. At the start of the load balancing process, because no user or service has been yet transferred from its existing carrier to a target carrier, the $W_{CTR}$ value representing a number of times a user-associated communication link has already been transferred from one carrier to another carrier and/or a number of times a user-associated communication link has been exchanged between two specific carriers is initialized to zero for all users including user u1. Therefore, for the above load metric calculation, $W_{CTR}$ value is equal to zero. Similarly, at the beginning of the load balancing process, because no communication link has been transferred yet, $W_{QoS\_NBR}$ value is initialized equal to zero for all users including user u1. Accordingly, in this example, the load metric for user u1 as computed by load metric calculation module 230 using Eq. (1) is as follows:

$$LM_{u1} = \frac{20+1+0}{7+0} = 3.$$

In the manner similar to described above, load metric calculation module 230 computes the load metric, LM, for each user associated with the overloaded carrier, and sorts the computed load metric values for all users in an increasing or decreasing order to determine the user associated with the highest (or lowest) load metric value. In some embodiments, the user associated with the highest load metric value is considered the user whose communication link or service flow(s) should be first moved (i.e., operations of that user are most-deserving to be moved) from the current overloaded carrier to a target carrier. As discussed above, the communication link of the transfer-deserving user is transferred from the overloaded carrier to a target carrier using transfer module 240. After the communication link transfer, the $W_{CTR}$ value for the transfer-deserving user is updated, e.g., increased by one. Similarly, the $W_{QoS\_NBR}$ value is updated based on the service flows (i.e., QoS values) that have been transferred from the overloaded carrier and are now operational on the target carrier.

In some embodiments, after the first communication link transfer, threshold detection module 225 may determine if an operational parameter, e.g., traffic load, of the overloaded carrier is still violating (e.g., greater than) a threshold value, e.g., hard threshold value. If so, the load balancing process continues by selecting the user with the second highest load metric value, and transferring (using transfer module 240) its communication link from the overloaded carrier to a target carrier. In some embodiments, the target carrier for the user associated with the second highest load metric value may be same or different than the target carrier for the user associated with the highest load metric value. The above-described processes of threshold comparison and communication link transfer continue for other remaining users associated with the overloaded carrier until, e.g., the traffic load of the overloaded carrier is less than the hard threshold value.

In a case where all carriers of BS 110 are heavily loaded, i.e., traffic load of each of the carriers is greater than the hard threshold value, BS 110 may be configured to still accept a new user (or service flow) that is being added to BS 110 coverage area as initial network entry or re-entry as long as there is a margin between a Call Admission Control (CAC) threshold and the hard threshold. CAC threshold may be defined for non-BE flows (e.g., "real-time" voice or data) and can be used to set some resources aside for BE.

In some embodiments, threshold detection module 225 may determine that an operational parameter, e.g., traffic load, of a carrier of BS 110 is less than the hard threshold value, but greater than a soft threshold value (that is less than the hard threshold value). Such determination may indicate uneven loading conditions across carriers of BS 110, which may be unacceptable for active communication sessions of users associated with BS 110. Accordingly, to address this loading variation problem, equalization module 235 may be configured to perform load equalization for all carriers of BS 110. In some embodiments, equalization module 235 may perform equalization upon determination by threshold detection module 225 that actual or absolute traffic load value of one or more carriers of BS 110 is greater than an "absolute soft" threshold value. Equalization module 235 may consider an additional determination by threshold detection module 225 before triggering equalization, e.g., whether the difference in traffic load values of one or more pairs of carriers of BS 110 is greater than a "relative soft" threshold value.

Figure 4:
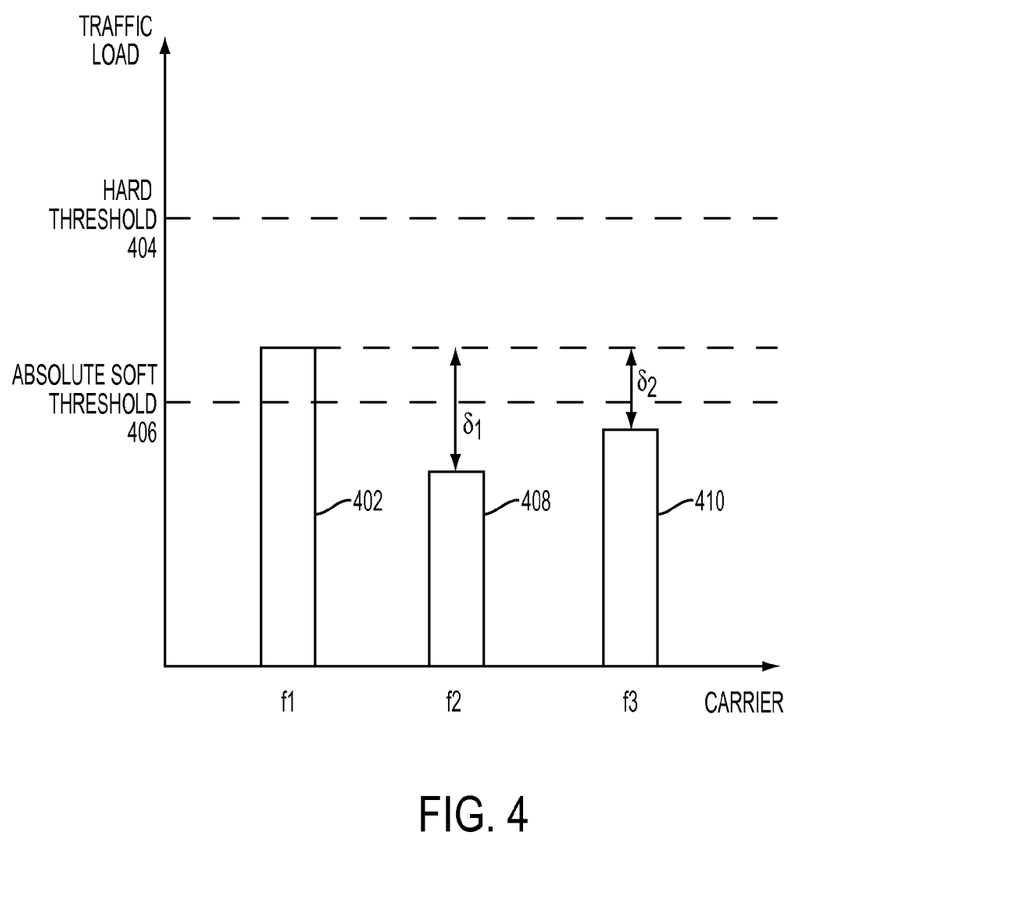
FIG. 4 provides an illustration of loading and triggering conditions of carriers with respect to various threshold values.

The above-described equalization triggering conditions are illustrated in FIG. 4. As shown, equalization module 235 may trigger equalization when it is determined, e.g., by threshold detection module 225, that load of carrier $f1$ 402 is less than hard threshold 404 but greater than absolute soft threshold value 406. Additionally, or alternatively, equalization may be triggered when it is determined that load difference ($\delta$) between any two carriers, e.g., $f1$ 402 and $f2$ 408, $f1$ 402 and $f3$ 410, or $f2$ 408 and $f3$ 410, is greater than the relative soft threshold (not shown). In some embodiments, equalization module 235 may not trigger the equalization process during network entry (i.e., initial network entry) or network re-entry, e.g., due to network entry/re-entry latency issue. As a result of the equalization process, the load of all carriers of BS 110 may be substantially equalized to a value that may or may not be less than the absolute soft threshold value.

Figure 6A:
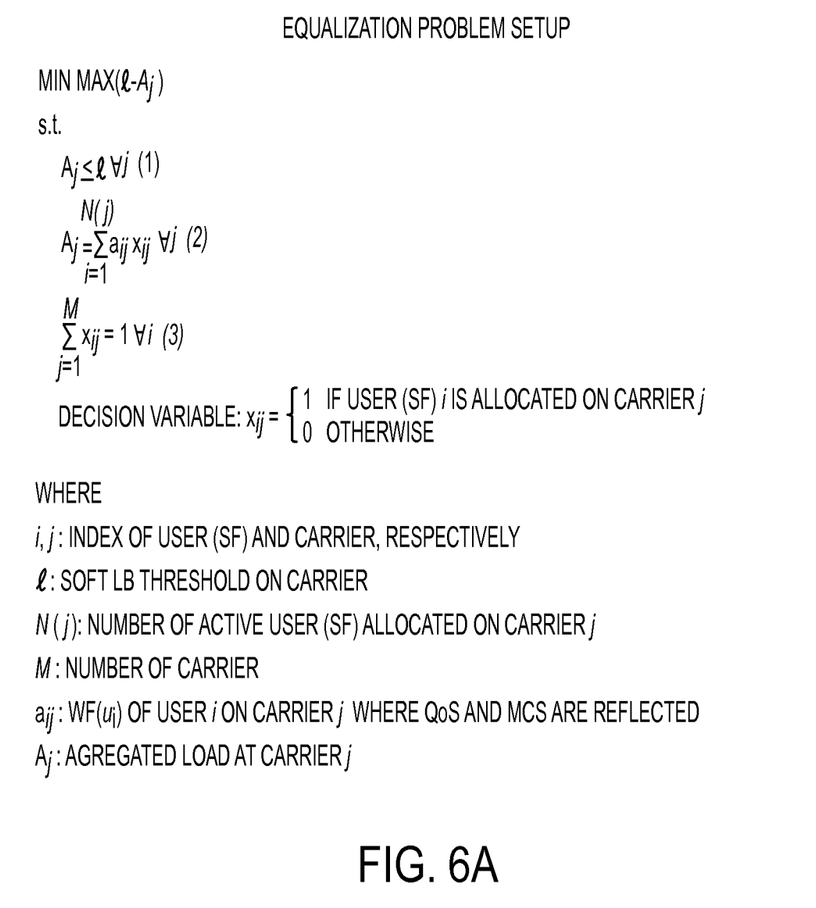
FIGS. 6A-6C provide examples of equalization algorithms in accordance with various embodiments of this disclosure.
Figure 6B:
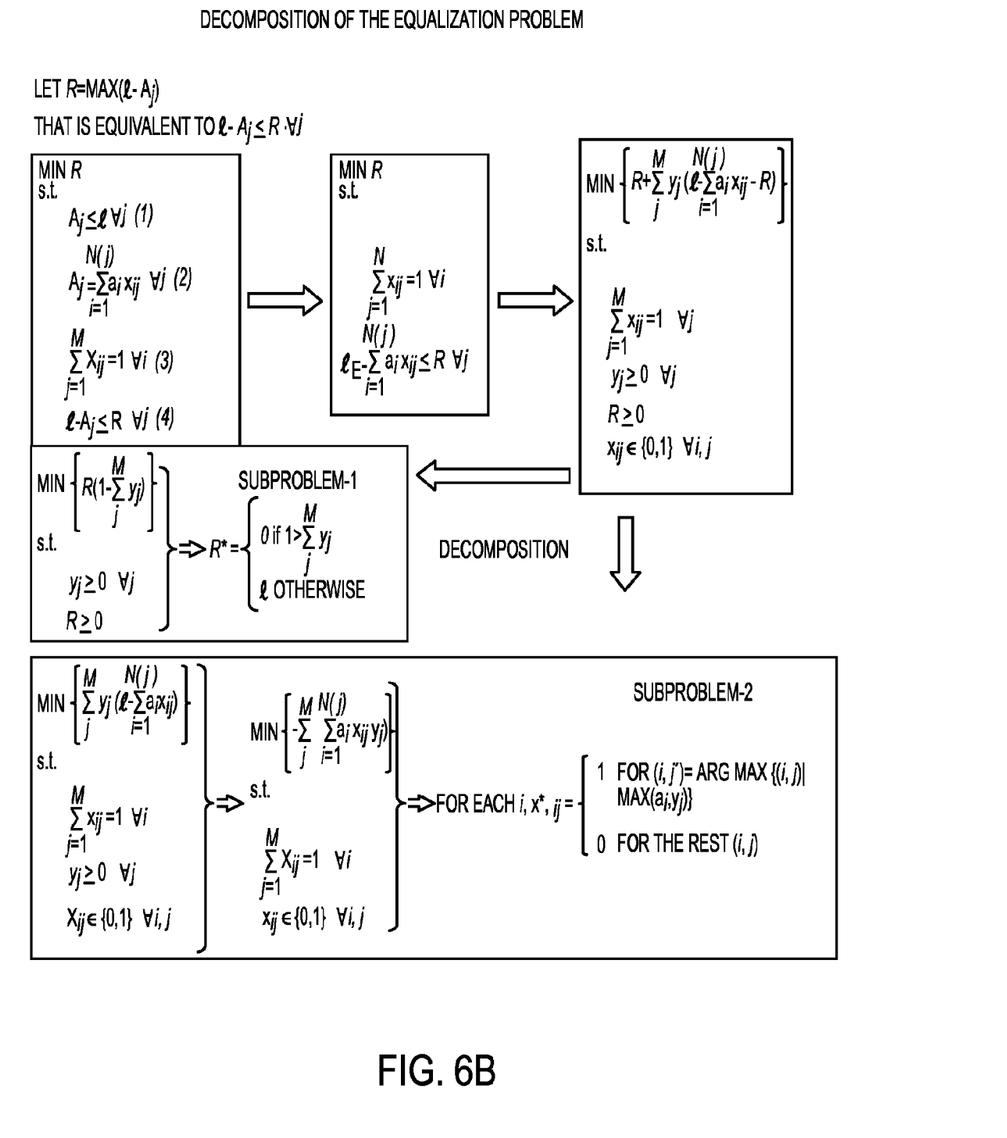
Figure 6C:
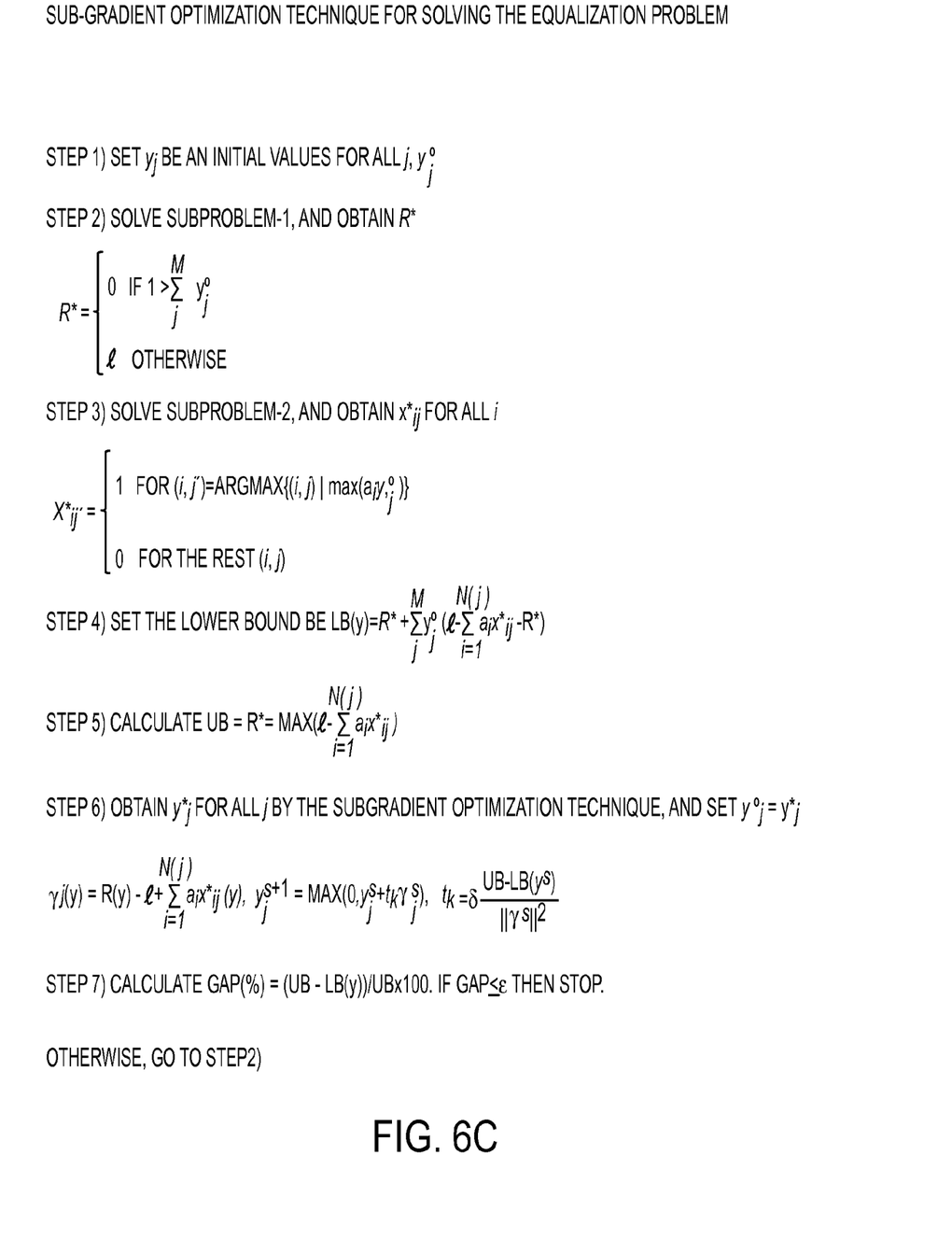

FIGS. 6a-6c provide exemplary equalization algorithms for implementation in equalization module 235. Those algorithms are used to obtain a near-optimal solution by applying an optimization technique, e.g., 0-1 integer programming technique. The objective of the equalization algorithm is to minimize the maximum spare capacity of carriers of BS 110 under a constraint that the traffic load of the carriers is less than the soft threshold value, e.g., absolute soft threshold. These algorithms are self-explanatory and would be understood by a person of ordinary skill in the art.

Figure 5:
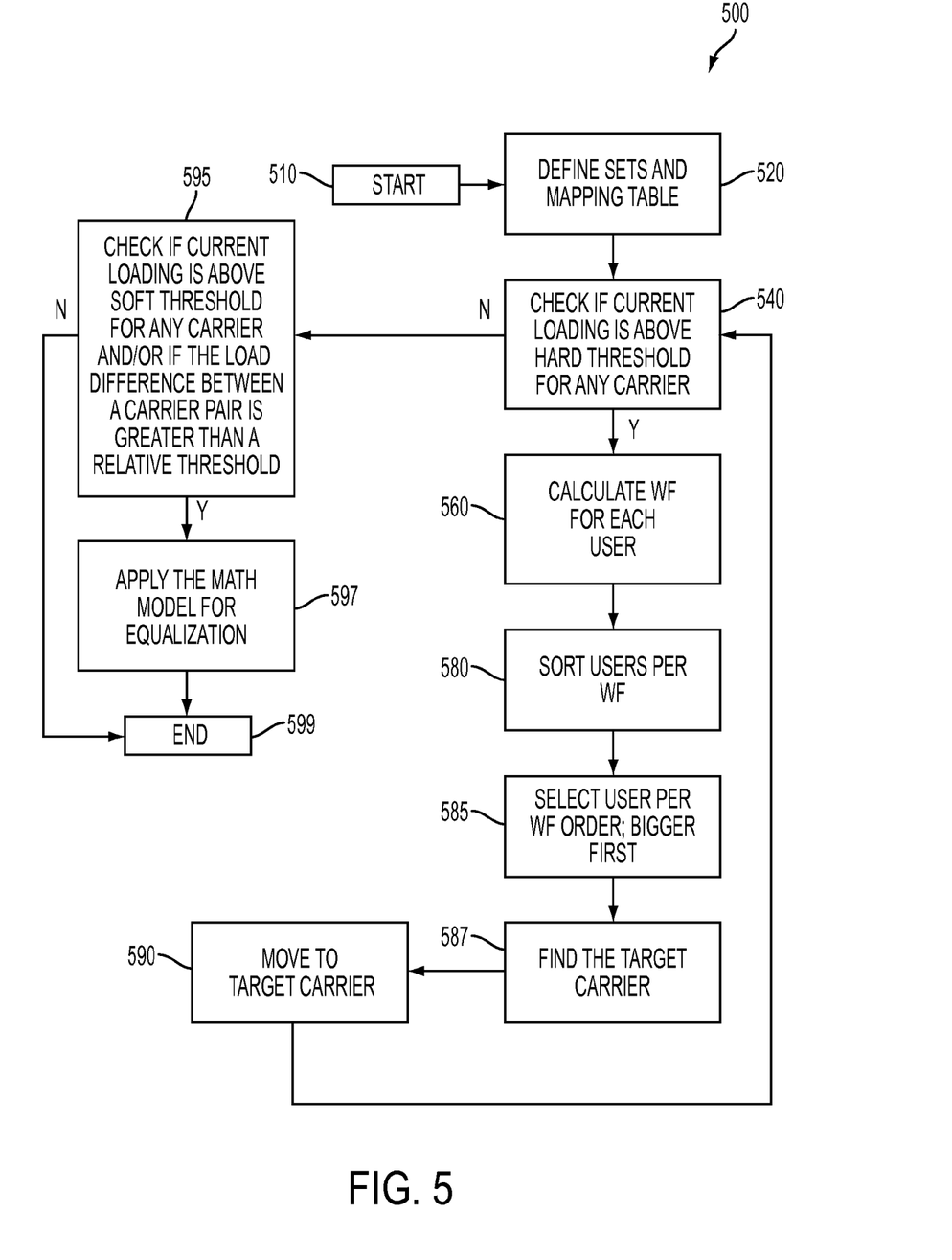
FIG. 5 provides an exemplary flowchart of a method of an embodiment of this disclosure.

Turning now to FIG. 5, the exemplary flowchart of process 500 illustrates a generalized embodiment of the load balancing technique, e.g., as carried out by apparatus 200. Process 500 starts at step 510, and proceeds to step 520 in which, for each carrier, various sets and mapping relations between the sets are defined. For example, as discussed above and shown in FIG. 3, a mapping relation may be defined for a carrier indicating relations between users 302 (from user set 304) communicating over that carrier, service flows 306 (from service flow set 308) associated with each user 302, MCS options 310 (from MCS set 312) assigned to each user 302, and number of slots 314 (from slot set 316) allocated to each user 302.

At step 540, it is checked, e.g., by threshold detection module 225, if current loading for any carrier of BS 110 is above the hard threshold value. If it is determined that loading of a carrier is greater than the hard threshold value, i.e., the response "Y" to step 540, at step 560, a comprehensive load metric for each user associated with that overloaded carrier is calculated, e.g., by load metric calculation module 230 as described above. At step 580, the users associated with the overloaded carrier may be sorted in increasing or decreasing order of their respective load metric values. At step 585, the user associated with the highest calculated load metric value may be selected as the user whose communication link (or one or more service flows) will be transferred from the overloaded carrier to a target carrier. At step 587, a target carrier may be determined by target selection module 245, and at step 590, a communication link of the user associated with the highest load metric value is transferred from the overloaded carrier to the target carrier by transfer module 240. After step 590, processing returns to step 540, where threshold detection module 225 further checks if any carrier load is greater than the hard threshold, and if so, the process repeats steps 560-590 for load balancing.

If the response is "N" after hard threshold check at step 540, at step 595, threshold detection module 225 checks if current loading for any carrier (or loading difference for any carrier pair) is greater than an absolute threshold soft threshold value (or relative soft threshold value). If the response is "Y" for step 595, at step 597, equalization is performed by equalization module 235, e.g., using the equalization algorithm provided in the Appendix of this disclosure. However, if the response is "N" for step 595, no load balancing or equalization process is triggered and the process 500 ends at step 599.

Further, the above processes may be implemented as computer instructions embodied on a physical, tangible (i.e., non-transitory) computer-readable medium which, when executed by a processor in or otherwise associated with BS 110, carries out the functionality of the embodiments described above.

In addition, over-the-air provisioning of software updates and/or data updates from a base station to a device (or subscriber station) may be made along the lines of the embodiments discussed above.

Those with skill in the art will appreciate that the inventive concept described herein may work with various system configurations. In addition, various embodiments of this disclosure may be made in hardware, firmware, software, or any suitable combination thereof. As discussed above, various aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of balancing traffic load in a wireless communication network, the method comprising:
    calculating, using a processor operatively associated with a first base station, a load metric for each of a plurality of users, wherein each of the plurality of users, in operation, are in communication with the first base station using an overloaded carrier associated with the first base station, and wherein the calculated load metric for each of the plurality of users is representative of a combination of a plurality of metric factors related at least to an associated communication link;
    determining, using the processor, a transfer-deserving user from the plurality of users, the transfer-deserving user being associated with a highest value of an associated calculated load metric;
    transferring, using the processor, the associated communication link of the transfer-deserving user from the overloaded carrier to a target carrier, wherein the target carrier is associated with either the first base station or a second base station; and
    if a traffic load of the overloaded carrier is less than a first threshold value and greater than a second threshold value, generally equalizing a combined traffic load of a plurality of carriers associated with the first base station such that an individual traffic load of each of the plurality of the carriers is essentially equalized to a value less than the second threshold value, wherein the plurality of carriers includes the overloaded carrier.

2. The method of claim 1, wherein, after the communication link of the transfer-deserving user is transferred, said calculating, said determining and said transferring are repeated for any remaining users in the plurality of users in communication with the first base station using the overloaded carrier.

3. The method of claim 1, wherein the metric factors comprise two or more parameters selected from the group consisting of: a service flow type associated with the user, a number of service flows associated with the user, a number of time slots allocated to the user, a modulation and coding scheme assigned to the user, a number of times a user-associated communication link has already been transferred from one carrier to another carrier, a number of times a user-associated communication link has been exchanged between two specific carriers, a service flow type associated with one or more users of a neighbor carrier associated with the first base station or the second base station, and a number of service flows associated with one or more users of the neighbor carrier,
    wherein each of the service flows of users associated with the overloaded carrier and the service flows of users associated with the neighbor carrier are represented by one of a plurality of Quality of Service (QoS) values.

4. The method of claim 1, wherein a traffic load of the target carrier is less than a target load threshold value.

5. The method of claim 1, wherein a signal strength (SS) of the target carrier is greater than a target SS threshold value.

6. The method of claim 1, further comprising:
    determining, using the processor, the traffic load of the overloaded carrier with respect to the first threshold value and the second threshold value,
    wherein said calculating is performed responsive to a determination that the traffic load of the overloaded carrier is greater than the first threshold value.

7. The method of claim 6, wherein said determining the traffic load of the overloaded carrier is performed periodically.

8. The method of claim 1, wherein at least one of the first threshold value or the second threshold value is a function of at least one of a plurality of threshold factors, the plurality of threshold factors comprising one or more parameters selected from the group consisting of: a total number of users in communication with the first base station using the plurality of carriers associated therewith, a total number of utilized time slots associated with the first base station, a number of time slots allocated to each of the plurality of carriers, a service flow type associated with each of the plurality of carriers, a number of service flows associated with each of the plurality of carriers, and a modulation and coding scheme assigned to one or more users associated with each of the plurality of carriers.

9. The method of claim 1, wherein at least one of the first base station and the second base station comprises a 3G base station.

10. The method of claim 9, wherein the 3G base station comprises a CDMA/EvDO base station.

11. The method of claim 1, wherein at least one of the first base station and the second base station comprises a 4G base station.

12. The method of claim 11, wherein the 4G base station comprises a WiMAX base station.

13. The method of claim 11, wherein the 4G base station comprises an LTE base station.

14. The method of claim 1, wherein at least one of the first base station and the second base station is operational with the plurality of users using a multiple access scheme, the multiple access scheme comprising Orthogonal Frequency Division Multiple Access (OFDMA).

15. A method of balancing traffic load in a wireless communication network, the method comprising:
    determining, using a processor operatively associated with a first base station, whether a new user has been associated with a plurality of existing users based on at least one of a plurality of triggering events, the triggering events comprising an initial network entry event, a re-entry event and a handover event, wherein the new user and each of the plurality of existing users, in operation, are in communication with the first base station using an overloaded carrier associated with the first base station; and
    responsive to a determination that the new user has been associated with the plurality of existing users, adjusting a traffic load of the overloaded carrier based on a load metric for each of the plurality of existing users and the new user, the load metric comprising a plurality of metric factors related to a respective user, wherein said adjusting includes transferring a communication link of at least one of the plurality of existing users or the new user from the overloaded carrier to a target carrier, wherein the target carrier is associated with either the first base station or a second base station,
    wherein the metric factors comprise two or more parameters selected from the group consisting of: a service flow type associated with the user, a number of service flows associated with the user, a number of time slots allocated to the user, a modulation and coding scheme assigned to the user, a number of times a user-associated communication link has already been transferred from one carrier to another carrier, a number of times a user-associated communication link has been exchanged between two specific carriers, a service flow type associated with one or more users of a neighbor carrier associated with the first base station or the second base station, and a number of service flows associated with one or more users of the neighbor carrier,
    wherein each of the service flows of users associated with the overloaded carrier and the service flows of users associated with the neighbor carrier are represented by one of a plurality of Quality of Service (QoS) values.

16. An apparatus capable of operating and balancing traffic load in a wireless network, the apparatus comprising:
    a transceiver configured to exchange data with each of a plurality of users via an associated communication link established using an overloaded carrier; and
    a processor operatively coupled to the transceiver, wherein the processor is configured to:
        calculate a load metric for each of the plurality of users, the load metric being representative of a combination of a plurality of metric factors related at least to the associated communication link;
        determine a transfer-deserving user from the plurality of users, the transfer-deserving user being associated with a highest value of an associated calculated load metric;
        transfer the associated communication link of the transfer-deserving user from the overloaded carrier to a target carrier, wherein the target carrier is associated with either said apparatus or another wireless apparatus of the wireless network; and
        if a traffic load of the overloaded carrier is less than a first threshold value and greater than a second threshold value, generally equalize a combined traffic load of a plurality of carriers associated with the first base station such that an individual traffic load of each of the plurality of the carriers is essentially equalized to a value less than the second threshold value, wherein the plurality of carriers includes the overloaded carrier.

17. The apparatus of claim 16, wherein, after the processor transfers the communication link of the transfer-deserving user, the processor is further configured to repeat said operations to calculate, determine and transfer for any remaining users in the plurality of users in communication with the transceiver using the overloaded carrier.

18. The apparatus of claim 16, wherein the metric factors comprise two or more parameters selected from the group consisting of: a service flow type associated with the user, a number of service flows associated with the user, a number of time slots allocated to the user, a modulation and coding scheme assigned to the user, a number of times a user-associated communication link has already been transferred from one carrier to another carrier, a number of times a user-associated communication link has been exchanged between two specific carriers, a service flow type associated with one or more users of a neighbor carrier associated with said apparatus or said other wireless apparatus, and a number of service flows associated with one or more users of the neighbor carrier,
    wherein each of the service flows of users associated with the overloaded carrier and the service flows of users associated with the neighbor carrier are represented by one of a plurality of Quality of Service (QoS) values.

19. The apparatus of claim 16, wherein a traffic load of the target carrier is less than a target load threshold value.

20. The apparatus of claim 16, wherein a signal strength (SS) of the target carrier is greater than a target SS threshold value.

21. The apparatus of claim 16, wherein the processor is further configured to:
    determine the traffic load of the overloaded carrier with respect to the first threshold value and the second threshold value,
    wherein the processor is configured to calculate the load metric for each of the plurality of users responsive to a determination that the traffic load of the overloaded carrier is greater than the first threshold value.

22. The apparatus of claim 21, wherein the processor is configured to determine the traffic load of the overloaded carrier on a periodic basis.

23. The apparatus of claim 16, wherein at least one of the first threshold value or the second threshold value is a function of at least one of a plurality of threshold factors, the plurality of threshold factors comprising one or more parameters selected from the group consisting of: a total number of users in communication with the transceiver using the plurality of carriers associated therewith, a total number of utilized time slots associated with the transceiver, a number of time slots allocated to each of the plurality of carriers, a service flow type associated with each of the plurality of carriers, a number of service flows associated with each of the plurality of carriers, and a modulation and coding scheme assigned to one or more users associated with each of the plurality of carriers.

24. The apparatus of claim 16, wherein the transceiver is configured to communicate with the plurality of users based on a 3G wireless technology.

25. The apparatus of claim 24, wherein the 3G wireless technology comprises CDMA/EvDO technology.

26. The apparatus of claim 16, wherein the transceiver is configured to communicate with the plurality of users based on a 4G wireless technology.

27. The apparatus of claim 26, wherein the 4G wireless technology comprises WiMAX technology.

28. The apparatus of claim 26, wherein the 4G wireless technology comprises LTE technology.

29. The apparatus of claim 16, wherein the transceiver is configured to communicate with the plurality of users using a multiple access scheme, the multiple access scheme comprising Orthogonal Frequency Division Multiple Access (OFDMA).

30. A non-transitory computer-readable medium comprising computer readable code physically embodied thereon which, when executed by a processor arranged in a first base station apparatus capable of operating in a wireless network, causes the processor to carry out a plurality of operations comprising:
   calculating a load metric for each of a plurality of users, wherein each of the plurality of users, in operation, are in communication with the first base station using an overloaded carrier associated with the first base station, and wherein the calculated load metric for each of the plurality of users is representative of a combination of a plurality of metric factors related at least to an associated communication link;
   determining a transfer-deserving user from the plurality of users, the transfer-deserving user being associated with a highest value of an associated calculated load metric;
   transferring the associated communication link of the transfer-deserving user from the overloaded carrier to a target carrier, wherein the target carrier is associated with either the first base station or a second base station; and
   if a traffic load of the overloaded carrier is less than a first threshold value and greater than a second threshold value, generally equalizing a combined traffic load of a plurality of carriers associated with the first base station such that an individual traffic load of each of the plurality of the carriers is essentially equalized to a value less than the second threshold value, wherein the plurality of carriers includes the overloaded carrier.

31. The computer-readable medium of claim 30, wherein the metric factors comprise two or more parameters selected from the group consisting of: a service flow type associated with the user, a number of service flows associated with the user, a number of time slots allocated to the user, a modulation and coding scheme assigned to the user, a number of times a user-associated communication link has already been transferred from one carrier to another carrier, a number of times a user-associated communication link has been exchanged between two specific carriers, a service flow type associated with one or more users of a neighbor carrier associated with the first base station or the second base station, and a number of service flows associated with one or more users of the neighbor carrier,
   wherein each of the service flows of users associated with the overloaded carrier and the service flows of users associated with the neighbor carrier are represented by one of a plurality of Quality of Service (QoS) values.

32. The computer-readable medium of claim 30, wherein a traffic load of the target carrier is less than a target load threshold value.

33. The computer-readable medium of claim 30, wherein a signal strength (SS) of the target carrier is greater than a target SS threshold value.

34. The computer-readable medium of claim 30, the plurality of operations further comprising:
   determining the traffic load of the overloaded carrier with respect to the first threshold value and the second threshold value,
   wherein said calculating is performed responsive to a determination that the traffic load of the overloaded carrier is greater than the first threshold value.

35. The computer-readable medium of claim 30, wherein at least one of the first threshold value or the second threshold value is a function of at least one of a plurality of threshold factors, the plurality of threshold factors comprising one or more parameters selected from the group consisting of: a total number of users in communication with the first base station using the plurality of carriers associated therewith, a total number of utilized time slots associated with the first base station, a number of time slots allocated to each of the plurality of carriers, a service flow type associated with each of the plurality of carriers, a number of service flows associated with each of the plurality of carriers, and a modulation and coding scheme assigned to one or more users associated with each of the plurality of carriers.

36. The computer-readable medium of claim 30, wherein at least one of the first base station and the second base station comprises a 3G base station or a 4G base station.

37. The computer-readable medium of claim 36, wherein the 3G base station comprises a CDMA/EvDO base station and the 4G base station comprises a WiMAX base station and/or an LTE base station.

38. The computer-readable medium of claim 30, wherein at least one of the first base station and the second base station is operational with the plurality of users using a multiple access scheme, the multiple access scheme comprising Orthogonal Frequency Division Multiple Access (OFDMA).

39. An apparatus capable of operating and balancing traffic load in a wireless network, the apparatus comprising:
   a transceiver configured to exchange data with each of a plurality of users via an associated communication link established using an overloaded carrier; and
   a processor operatively coupled to the transceiver, wherein the processor is configured to:
      determining whether a new user has been associated with a plurality of existing users based on at least one of a plurality of triggering events, the triggering events comprising an initial network entry event, a re-entry event and a handover event; and
   responsive to a determination that the new user has been associated with the plurality of existing users, adjusting a traffic load of the overloaded carrier based on a load metric for each of the plurality of existing users and the new user, the load metric representative of a combination of a plurality of metric factors related to a respective user, said adjusting including transferring a communication link of at least one of the plurality of existing users or the new user from the overloaded carrier to a target carrier, wherein the target carrier is associated with either the first base station or a second base station, wherein the metric factors comprise two or more parameters selected from the group consisting of: a service flow type associated with the user, a number of service flows associated with the user, a number of time slots allocated to the user, a modulation and coding scheme assigned to the user, a number of times a user-associated communication link has already been transferred from one carrier to another carrier, a number of times a user-associated communication link has been exchanged between two specific carriers, a service flow type associated with one or more users of a neighbor carrier associated with the first base station or the second base station, and a number of service flows associated with one or more users of the neighbor carrier, wherein each of the service flows of users associated with the overloaded carrier and the service flows of users associated with the neighbor carrier are represented by one of a plurality of Quality of Service (QoS) values.

* * * * *